(12) United States Patent
Williams (10) Patent No.: US 7,277,162 B2
(45) Date of Patent: Oct. 2, 2007

(54) DYNAMIC PERFORMANCE MONITORING OF LONG SLENDER STRUCTURES USING OPTICAL FIBER STRAIN SENSORS

(76) Inventor: Jerry Gene Williams, 1 Berryfrost La., The Woodlands, TX (US) 77380

( * ) Notice: Subject to any disclaimer, the term of this patent is extended or adjusted under 35 U.S.C. 154(b) by 462 days.

(21) Appl. No.: 10/764,634

(22) Filed: Jan. 23, 2004

(65) Prior Publication Data

US 2004/0206187 A1 Oct. 21, 2004

Related U.S. Application Data

(60) Provisional application No. 60/441,703, filed on Jan. 23, 2003.

(51) Int. Cl.
G01B 11/16 (2006.01)
(52) U.S. Cl. .................... 356/32; 73/800; 356/73.1
(58) Field of Classification Search ............. None
See application file for complete search history.

(56) References Cited

U.S. PATENT DOCUMENTS

| | | | | |
|---|---|---|---|---|
| 5,182,779 | A * | 1/1993 | D'Agostino et al. .......... 385/13 |
| 5,649,035 | A * | 7/1997 | Zimmerman et al. ......... 356/32 |
| 6,246,469 | B1 * | 6/2001 | Schier ....................... 356/5.09 |
| 6,271,766 | B1 * | 8/2001 | Didden et al. ........... 340/853.1 |
| 6,401,646 | B1 | 6/2002 | Masters et al. |
| 6,550,342 | B2 * | 4/2003 | Croteau et al. ............... 73/800 |
| 6,820,489 | B2 * | 11/2004 | Fernald et al. ................ 73/705 |
| 6,865,194 | B1 * | 3/2005 | Wright et al. .............. 356/73.1 |
| 6,913,079 | B2 * | 7/2005 | Tubel .......................... 356/72 |
| 6,957,576 | B2 * | 10/2005 | Skinner et al. .......... 73/152.51 |
| 6,999,641 | B2 * | 2/2006 | Williams et al. ............. 356/32 |
| 7,194,913 | B2 * | 3/2007 | Morrison et al. ............. 73/800 |

OTHER PUBLICATIONS

Douglas B. Johnson, Donald D. Baldwin, and K. Him Lo: "Composite Production Riser Development and Qualification Test Results," Composites for Offshore Operations-3, S. S. Wang, J. G. Williams and K. H. Lo, Eds. University of Houston—CEAC, 2001, pp. 109-123.

J. Murali, M. M. Salama, O. Jahnsen, and T. Meland: "Composite Drilling Riser—Qualification Testing and Field Demonstration," Composite Materials for Offshore Operations-2, S. S. Wang, J. G. Williams, and K. H. Lo, Eds., American Bureau of Shipping, 1999, pp. 115-128.

(Continued)

Primary Examiner—Gregory J. Tonley, Jr.
Assistant Examiner—Juan D. Valentin, II (57) ABSTRACT

A method is described using optical fiber technology to measure the vibration characteristics of long slender structures subjected to dynamic disturbances imposed by water or wind generated loads. The method is based on making bending strain measurements at selected locations along the length of long slender structures such as marine risers or large ropes using fiber optics technology including Optical Time Domain Reflectometry and Bragg diffraction gratings. Engineering interpretation of information obtained from bending strains determines the vibration characteristics including frequency, amplitude, and wave length. Maximum bending strain measurements assess pending structural damage. One application is measurement of vortex induced vibrations (VIV) response of marine risers. The fiber optics based method is also applicable to the measurement of the bending characteristics of spoolable pipe using plastic optical fibers which can be interpreted to assess the pipe structural integrity and to prevent lock-up during deployment into a small diameter annulus.

29 Claims, 3 Drawing Sheets

OTHER PUBLICATIONS

J. Kim Vandiver and O. M. Griffin: "Measurements of the Vortex Excited Strumming Vibrations of Marine Cables," Ocean Structural Dynamics Symposium, Corvallis, Oregon, Sep. 1982.

S.S. Wang, X. Lu, and T.P. Yu: "Vortex Induced Vibrations (VIV) of Composite Production Risers," Composites for Offshore Operations-3, S. S. Wang, J. G. Williams and K. H. Lo, Eds. University of Houston—CEAC, 2001, pp. 199-213.

J. Kim Vandiver: "Research Challenges in the Vortex-induced Vibration Prediction of Marine Risers", Proceedings of the Offshore Technology Conference, Paper No. 8698, Houston, May 1998.

J. Kim Vandiver, K. Vikestad and C. M. Laren: "Norwegian Deepwater Riser and Mooring: Damping of Vortex-Induced Vibrations," Proceedings of the 2000 Offshore Technology Conference, Paper No. 11998, Houston, TX, May 1-4, 2000.

M. K. Barnoski, M. D. Rourke, S. M. Jensen, and R. T. Melville: "Optical Time Domain Reflectometer," Applied Optics, vol. 16, No. 9. Sep. 1977.

Smith, D. Barton and Williams, Jerry G.: Monitoring Axial Strain in Synthetic Fiber Mooring Ropes Using Polymeric Optical Fibers. 22nd International Conference on Offshore Mechanics and Arctic Engineering, Cancun, Mexico, Jun. 8-13, 2003.

Jerry G. Williams and D. Barton Smith: "Direct Measurement of Axial Strain in Synthetic Fiber Mooring Ropes Using Polymeric Optical Fibers," Fourth International Conference On Composite Materials for Offshore Operations. Houston, TX, Oct. 4-6, 2005.

Jerry G. Williams and Alex Sas-Jaworsky II: "Composite Spoolable Pipe Development, Advancements, and Limitations," Offshore Technology Conference Paper 12029. Houston, Texas, May 1-4, 2000.

* cited by examiner

DYNAMIC PERFORMANCE MONITORING OF LONG SLENDER STRUCTURES USING OPTICAL FIBER STRAIN SENSORS

DESCRIPTION

This application claims priority from U.S. Provisional Patent Application No. 60/441,703, filed Jan. 23, 2003 entitled "Fiber Optics Strain Measurement On Composite Tubulars", herein incorporated by reference in the entirety.

FIELD OF THE INVENTION

The present invention relates to a fiber optics system which provides the capable to measure in situ the vibration characteristics of long slender structures excited by dynamic disturbances imposed by water or wind generated loads. Long slender structures include, but are not limited to composite or metal risers and tubing used in offshore petroleum industry drilling and production operations and large ropes and cables. For example, the method can be used to measure the magnitude, period, and frequency of Vortex Induced Vibrations (VIV) of risers used in offshore petroleum drilling and production operations; and more particularly, through engineering interpretation of the bending strain data to predict the fatigue life of the tubular and to allow active controls to be used to mitigate the potential damage from VIV. In addition, the fiber optics system can provide bending strain information which can be used to predict the life of spoolable pipe and the onset of buckling induced lock-up during deployment into a small diameter annulus.

BACKGROUND OF THE INVENTION

Highly successful exploration and production of oil and gas in recent years from deepwater Gulf of Mexico (GOM) and other parts of the world have generated high interest in leasing, exploring and developing deepwater petroleum resources. Deepwater presents many new challenges with the design of long slender structures such as marine risers in which the length of the structure is significantly greater than the other two dimensions. Marine rises are especially susceptible to the potentially damaging effects of dynamic disturbances such as Vortex Induced Vibrations (VIV). Risers used in offshore drilling and oil and gas production provide a critical safety function as well as protecting the environment from oil spills. These long slender tubular structural elements must operate reliably in the harsh marine environment, sometimes for decades. As the water depth of exploration and production operations has increased, so has the challenge imposed on the design and reliability of risers and other long slender structures subjected to vibrations induced by water and wind induced loads. Corrosion or damage can occur and VIV can impose excessive stress and fatigue damage. The capability to inspect and monitor long slender structure dynamic performance has therefore become an important technology issue; particularly when the inspection must be conducted in situ.

Although steel has been the material of choice for risers for decades, composite and titanium risers are increasingly gaining attention because of the weight and economic advantages they provide in deepwater. The composites and oil industry have supported research and development on composite risers for over twenty years and although many believe the technology is ready for deployment, the expectation has not yet been fulfilled except in isolated trial deployments. Discussion of issues associated with the introduction of composite risers into service can be found in the following references, which are incorporated herein by reference: Douglas B. Johnson, Donald D. Baldwin, and K. Him Lo: "Composite Production Riser Development and Qualification Test Results," Composites for Offshore Operations-3, S. S. Wang, J. G. Williams and K. H. Lo, Eds. University of Houston-CEAC, 2001, pp. 109-123 and by J. Murali, M. M. Salama, O. Jahnsen, and T. Meland: "Composite Drilling Riser-Qualification Testing and Field Demonstration," Composite Materials for Offshore Operations-2, S. S. Wang, J. G. Williams, and K. H. Lo, Eds., American Bureau of Shipping, 1999, pp. 115-128. Probably the most important factor limiting the acceptability of this needed service is the reluctance of regulatory agencies to approve introduction of such safety critical component without the accompaniment of reliable methods for inspection. The oil and composites industries recognize the need for proven inspection methods to accompany into offshore service new safety critical applications such as composite risers. Likewise there is a need to monitor the safety of large diameter ropes used for station keeping of offshore platforms and of large cables commonly used in civil engineering structures subjected to water or wind induced vibrations. Discussion of issues associated with Vortex Induced Vibrations in this type of long slender structure can be found in the following reference, which is incorporated herein by reference: J. Kim Vandiver and O. M. Griffin: "Measurements of the Vortex Excited Strumming Vibrations of Marine Cables," Ocean Structural Dynamics Symposium, Corvallis, Oreg. September 1982.

Vortex Induced Vibrations (VIV) is a very important design constraint imposed in the design of deepwater risers and one must address the effect it can have on the fatigue life. Discussion of some of the design issues associated with VIV in risers can be found in the following references, which are incorporated herein by reference: S.S. Wang, X. Lu, and T.P. Yu: "Vortex Induced Vibrations (VIV) of Composite Production Risers," Composites for Offshore Operations-3, S. S. Wang, J. G. Williams and K. H. Lo, Eds. University of Houston-CEAC, 2001, pp. 199-213 and by J. Kim Vandiver: "Research Challenges in the Vortex-induced Vibration Prediction of Marine Risers", Proceedings of the Offshore Technology Conference, Paper No. 8698, Houston, May 1998. Although metal components have established methods of inspection when there is ready access, in situ methods are not well established or available. Composites exhibit different failure modes than metals and have different physical characteristics and specialized inspection methods such as ultrasonic, radiography, and acoustic emission have been used; however, they do not address the need to make deepwater in situ measurements. The availability of in situ Non-Destructive Evaluation (NDE) monitoring techniques for high performance safety critical long slender structures such as risers is urgently needed in the petroleum industry to accelerate the acceptance of composites technology and to address safety and reliability concerns for both metal and composite components. Information concerning the vibration characteristics and maximum bending strains being imposed on risers would permit intervention using active avoidance methods or help to improve design solutions such as described in the following reference, which is incorporated herein by reference: J. Kim Vandiver, K. Vikestad and C. M. Laren: "Norwegian Deepwater Riser and Mooring: Damping of Vortex-Induced Vibrations," Proceedings of the 2000 Offshore Technology Conference, Paper No. 11998, Houston, Tex., May 1-4, 2000. U.S. Pat. No.

6,401,646 to Masters, et al. describe the application of shrouds, strakes and fairings to reduce the dynamic effects of Vortex Induced Vibrations on pipes immersed in a fluid, which is incorporated herein by reference.

One very effective way of monitoring structural performance is to measure the strain response to load. Strain can be compared to design predictions and monitoring the change in strain during service can be a very effective indicator of structural degradation due to overload, impact, environmental degradation or other factors. Advanced fiber optics technology is a reliable in situ method not only to measure peak strain values but bending strain information can be used to determine the vibration response imposed during dynamic loading such as by Gulf of Mexico loop currents. Bending strain is represented by the difference in the strain along the longitudinal axis measured at opposite ends of an imaginary line drawn perpendicular to the longitudinal axis of the long slender structure and through the structure centroid. The maximum bending strain occurs on an axis perpendicular to the structure longitudinal axis and perpendicular to the axis of zero bending strain. Fiber optics technology including Optical Time Domain Reflectometry (OTDR), Optical Frequency Domain Reflectometry and Bragg defraction grating methods are ideally suited for in situ measurement of strain in long slender structures. Bragg gratings are particularly valuable for making local strain measurements while the Optical Time Domain Reflectometry method is ideally suited for making global strain measurements such as the average strain over the length of a riser or several risers.

Fiber optics technology has matured rapidly in recent years with emphasis for use both in communications and for structural monitoring. U.S. Pat. No. 6,550,342 to Croteau, et al. disclose a non-intrusive method for measurement of the flow characteristics of a fluid in a pipeline based on an apparatus for varying the gain (sensitivity) of an fiber optic sensor using a circumferential strain attenuator. U.S. Pat. No. 6,271,766 to Didden, et al. discloses a fiber optics sensing system focused on the measurement of pressure, temperature, liquid fraction, flow, acoustic, seismic, resistivity, corrosion, and pipe wall build-up. The system records the data in a manner which allows selective billing only for the specific measurement services provided. U.S. Pat. No. 5,649,035 to Zimmerman, et al. discloses a fiber optics strain gage patch which measures the local strain response of a structure like a bridge. The strain gage is constructed of circumferential loops of an optical fiber to increase the strain measurement sensitivity and uses OTDR instrumentation to measure the strain.

OTDR is a time of flight method which measures spatial positions along an optical fiber by launching brief pulses of laser light into one end of the fiber and then detecting the subsequent reflections at reflective interfaces inserted along the length of the fiber. The principles of the use of optical fibers technology to measure strain are well established. Discussion of OTDR principles can be found in the following reference, which is incorporated herein by reference: M. K. Barnoski, M. D. Rourke, S. M. Jensen, and R. T. Melville: "Optical Time Domain Reflectometer," Applied Optics, Vol. 16, No. 9. September 1977. The optical fiber is rigidly attached to the long slender structure and thus experiences strain identical to that imposed on the structure. By measuring the transit time of the reflected pulses and by knowing the speed at which light travels in the optical fiber, a very accurate measure of the distance to each reflective interface can be obtained. As the gauge section defined as the length between two reflective interfaces placed within the optical fiber undergoes strain, the interface's spatial position along the fiber changes and the OTDR measurement of this change in length is a direct measurement of the average strain in the structural component. An OTDR with a picosecond pulsed light source can measure a change in length as small as 0.4-inch with an accuracy of about +−.0.001 inch. A change in length of 0.4 in a 70-ft riser converts to a strain of 0.05%.+−.0.001%, which is sufficiently accurate to measure strains in the expected range of 0.07%. If needed, the accuracy can be increased in the riser application by making more than one traverse loop along the length of the pipe and thus provide a longer gage length. A single optical fiber can be used to measure strains at more than one location by imposing multiple reflective surfaces along the length of the optical fiber in combination with customized software algorithms to measure strain between each adjacent reflective interface. Measurement of the longitudinal strain in a long slender structure provides valuable information about the state of the "fitness for service" when compared to design allowables and expected conditions.

Although OTDR and Bragg diffraction are the preferred methods for making strain measurements, other optical fiber methods can also be used including Optical Frequency Domain Reflectometry (OFDR). The primary use of OFDR is for measuring reflections in optical fiber networks. In an OFDR instrument, the optical frequency of the signal laser is modulated in a periodic manner. The OFDR instrument uses an internal reflection to provide a reference of the modulated output. Light reflected from interfaces in the fiber returns to the ORDR, and these light signals are mixed with the reference signal, producing a mixture of optical frequencies. The waveform resulting from this frequency mixture is then analyzed using Fast-Fourier Transfer (FFT) signal analysis. This analysis provides information on the spatial positions of the each reflectance. The primary advantages of the OFDR technique are the excellent signal-to-noise and dynamic range characteristics.

Vortex-induced dynamic motion imposed by ocean currents typically have a period greater than 2 seconds and a wavelength involving several lengths of riser. Both the OTDR and Bragg diffraction grating techniques can be used to measure the bending strains imposed by VIV on offshore marine risers. With the OTDR method, the measured bending strains will have a value which can be interpreted to calculate the average radius of curvature. Although monitoring a single riser at a critical location may be sufficient, several risers segments at selected locations along the entire riser string can also be monitored including the region adjacent to the ocean floor. By placing optical fibers sensors on diametrically opposite sides of the tube, one can determine the strains due to bending which occur during the dynamic vibration imposed by the ocean currents, i.e., VIV. Since the direction of bending is not know, several diametrically opposed optical fiber sets must be introduced into the composite tube to be assured of obtaining the maximum bending effect. With sufficient numbers of bending strain measurements, one can also determine the location of nodes (locations along the length without bending) and thus the periodic wave length. From maximum bending strains one can calculate the radius of curvature and thus the vibration amplitude. The vibration frequency can also be determined since the strain measurements are made as a function of time.

Many methods have been developed to inspect the integrity of metal and composite components including ultrasonic, radiography, and acoustic emission. Each of these methods, however, does not address the need to inspect the component while performing the intended function in the marine environment. An in situ method is needed to monitor in real time the strains experienced by an offshore component such as a metal or composite riser. The fiber optics method of the current invention provides the capability to determine the state of fitness for service of these composite tubular components and provide the data needed to enhance safety and thus provide important operational safety quality assurance.

Visual inspection using a Remotely Operated Vehicle (ROV) is another method employed in offshore operations to inspect risers but a visual method is only superficial and does not provide the strain data needed to make precise engineering assessment of the structural integrity of the riser.

An Optical Time Domain Reflectometry (OTDR) technique for measuring the strain in a mooring rope is described in U.S. Pat. No. 6,999,641 B2 in which plastic optical fibers are used to make direct measurement of the large axial strains typically experienced by offshore platform mooring ropes (3% and higher). Detailed discussion of the application of plastic optical fibers to the measurement of strain in large diameter ropes is presented in the following references which are incorporated herein by reference: Smith, D. Barton and Williams, Jerry G.: Monitoring Axial Strain in Synthetic Fiber Mooring Ropes Using Polymeric Optical Fibers. 22nd International Conference on Offshore Mechanics and Arctic Engineering, Cancun, Mexico. Jun. 8-13, 2003. and by Jerry G. Williams and D. Barton Smith: "Direct Measurement of Axial Strain in Synthetic Fiber Mooring Ropes Using Polymeric Optical Fibers," Fourth International Conference On Composite Materials for Offshore Operations. Houston, Tex., Oct. 4-6, 2005. The strains in risers are significantly lower (less than 1%) and thus allow glass optical fibers to be used which exhibit much less attenuation (loss of light) than plastic optical fibers yet have a practical strain limitation well within the range of the riser and similar long slender structures. The application of fiber optics to the riser application is significantly different from the rope application, however, the OTDR hardware required to make strain measurement is generally applicable and is similar to that used in the telecommunications industry to measure the location of broken optical fibers.

The deficiency of the visual inspection method is that it reveals nothing about the strain in the riser or provide adequate information to assess the criticality of Vortex Induced Vibration and most likely; for operational safety concerns, would not be available during the most critical load history of the riser such as during storms. In addition, it is difficult and expensive to reliably inspect risers in situ using ROV technology.

Traditional nondestructive inspection methods do not address the need to inspect and make measurements in situ in the marine environment.

Another long slender structure to which the strain measurement technology described above applies is to characterize dynamic behavior of large diameter ropes and cables subjected to water or wind generated vibrations. Large denotes a rope or cable sufficiently large in cross-section that bending strains are detectable as the long slender structure experiences vibration induced local bending. Large diameter mooring ropes, for example, are used for station keeping of offshore platforms and are subjected to VIV similar to that described above for risers. Large cables used as guide wires to stabilize tall towers is an example of a long slender structure subjected to wind generated vibrations.

A further application for the measurement of bending strains using the optical fiber system in long slender structures described herein is to characterize the buckling behavior of metal or composite spoolable pipe as it is injected into a small diameter annulus such as an oil well bore hole. Discussion of composite spoolable pipe technology can be found in the following reference: Jerry G. Williams and Alex Sas-Jaworsky II: "Composite Spoolable Pipe Development, Advancements, and Limitations," Offshore Technology Conference Paper 12029. Houston, Tex., May 1-4, 2000. Spoolable pipe used as coiled tubing is typically taken off a large spool on which it has previously been wound and injected into a bore hole by the counter-rotating head of a coiled tubing injection rig. The counter-rotating heads of the Coiled Tubing Injector grip the pipe and impose axial compressive force to push the coiled tubing into the bore hole. Advanced applications of coiled tubing involve deployment into deviated and horizontal wells as well as vertical wells. Significant resistance to insertion can build up at the insert end of the coiled tubing requiring greater and greater injection force to keep it moving into the bore hole. As the resistance increases a condition is reached in which the applied compression force becomes sufficient to cause the pipe to buckle into a Spiral or Helical Buckle pattern (similar to a 3-dimensional "S" shape) inside the annulus. As large and larger axial compression forces are applied, the wave length (axial length of a repeated buckle pattern) of the spiral buckle gets shorter and shorter and a condition develops in which the spoolable pipe becomes locked in the annulus and cannot be withdrawn by the coiled tubing injector as it applies axial tension to retract the long slender structure.

Many long slender structures such as risers are composed on multiple discrete length segments joined together by threaded couplings to form the structure. In the coupling transition region between jointed segments the optical fiber is typically channeled into a coupling box attached to each end of the jointed segment. The optical fiber leads going into the coupling box are protected against bending and damage by the bonding agent and by the outer protective layer. The optical fiber leads are isolated against strain in the transition region by inserting them in a protective tube. Reflective interfaces may be placed at any location along the assembly including within a single segment or between multiple segments. For reflective interfaces located in different segments, the gage length is adjusted to account for the zero strain segment in the vicinity of the end termination and fiber optics connection box. Optical fiber signals are transmitted to the electronic optical signal monitoring instrumentation by means of an optical fiber or alternatively, the electronic optical signal monitoring instrumentation can be located remotely and digitized data transmitted by electric signal hard wire or radio signal to the accessible data acquisition system.

It is therefore an object of the invention to describe an optical fiber strain measurement system incorporating glass optical fibers or large strain plastic optical fibers to determine the bending strain in long slender structures and to use the bending strain information for the purpose of determining the structures vibration or buckling characteristics. In the application, the optical fibers are integrally attached near the outside of a metal or composite long slender structure using a bonding agent such as epoxy and protected from the environment including sea water and service damage by the bonding agent and an additional layer of polymer or elastomeric material and thus experience identical strain to that imposed on the structure.

An alternative location for placement of optical fibers for metal spoolable pipe used as coiled tubing is to place them on the inside of the pipe. Positioning the longitudinal optical fibers on the inside of the pipe addresses the potential problem of damage to the optical fibers by the gripper blocks of a coiled tubing injector. For composite spoolable pipe, the optical fibers can be positioned anywhere in the cross-section if inserted during the manufacturing process. One process for attaching the optical fibers on the inside of long slender tubular is to prefabricate a cylindrical metal or composite foil containing an adhesive, such as a high temperature epoxy, on the outer surface of the foil and to locate longitudinal optical fibers on the foil at selected locations around the circumference of the foil. After fabrication of the metal coiled tubing, the foil would be pulled inside the tubing and the foil cylinder internally pressurized with a hot fluid or gas to force the foil to expand and to cure the bonding agent to the inside of the long slender tubular structure.

It is another object of the invention to provide a strain measurement system for assessing the vibration characteristics and structural integrity of large ropes and cables using optical fiber strain measurement methods to determine the bending strain at selected locations along the long large rope or cable.

It is another object of the invention to use time of flight optical fiber strain measurement methods including Optical Time Domain Reflectometry (OTDR) to determine the bending strains in long slender structures by placing optical fibers along the axis of the metal or composite long slender structure starting at one end and traversing to the other end and if needed, to provide greater strain resolution; to loop the optical fiber back and forth as many times as needed to amplify the displacement magnitude.

It is another object of the invention to provide a method using the Optical Time Domain Reflectometry (OTDR) fiber optics method to measure bending strains in a long slender metal or composite structure made up of jointed segments including a single or multiple long segments including the entire length.

It is another object of the invention to provide a system utilizing Optical Time Domain Reflectometry (OTDR) and axially oriented optical fibers to determine the magnitude of bending strains imposed on metal or composite tubulars subjected to cyclic vibration such as induced in a metal or composite riser subjected to ocean currents, i.e., Vortex Induced Vibrations (VIV).

It is another object of the invention to provide a fiber optics system to measure the large axial bending strains typically imposed on long slender metal or composite spoolable pipe during deployment from a spool and into and out of a small diameter annulus using plastic optical fiber composed of polymeric materials including polymethyl methacrylate and perfluorocarbon, which have strain capabilities exceeding 5-percent with relatively low attenuation.

It is another object of the invention to provide a fiber optics method to measure the bending strains imposed on spoolable composite pipe during deployment into and out of a small diameter annulus for the purpose of preventing a condition of lock-up of the pipe inside the annulus.

It is another object of the invention to provide a means to incorporate multiple fiber optics bending strain sensors within a long slender structure or segment thereof.

It is therefore an object of the invention to provide a capability through multiplexing of the Optical Time Domain Reflectometry (OTDR) and Bragg Diffraction instrumentation to allow numerous optical fibers or multiple reflections within the same fiber to be monitored using a single or multiple instruments.

SUMMARY OF THE INVENTION

In accordance with the present invention, there is provided a method for in situ measurement of the bending strain of metal and composite tubulars located in the marine environment using optical fiber techniques including Optical Time Domain Reflectometry (OTDR) or Bragg diffraction gratings. The method uses these rapidly obtained bending strain measurements to determine the dynamic characteristics of long slender structure or to determine the spiral buckle characteristics and pending state of lock-up in spoolable pipe deployed into a small diameter annulus. The method provides the capability to determine the local bending strain along the length of the structure caused by wind or water induced disturbances and through engineering analysis to determine structural dynamic response characteristics including the vibration frequency, vibration peak amplitude, and periodic node to node wave length. For example, one can use the method to determine the vibration characteristics of offshore risers subjected to Vortex Induced Vibrations (VIV) imposed by marine ocean currents. In another application the bending strain measurements can be used to determine the dynamic response of large diameter ropes or cables subjected to wind or water induced vibrations. The optical fibers of either glass or polymeric composition are located near the external surface of the long slender structure following fabrication and bonded directly to the outer surface of the structure body and subsequently encapsulated in an outer protective cover. For long slender composite structures, the optical fibers may alternatively be integrated into the structure body and co-cured with it. Bragg gratings are particularly valuable for making local strain measurements while the Optical Time Domain Reflectometry method is ideally suited for making global strain measurements such as the average strain over a discrete segment of a long slender structure. Multiplexing of the light signal allows monitoring of several optical fibers as well as monitoring multiple discrete segments within a single optical fiber. The strain within discrete segments is facilitated by placing optical reflective interfaces at selected locations along the length of the optical fiber. Strain measurements are transmitted to the surface either by a continuous optical fiber light path or by telemetry of a digitized signal.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

Figure 1:
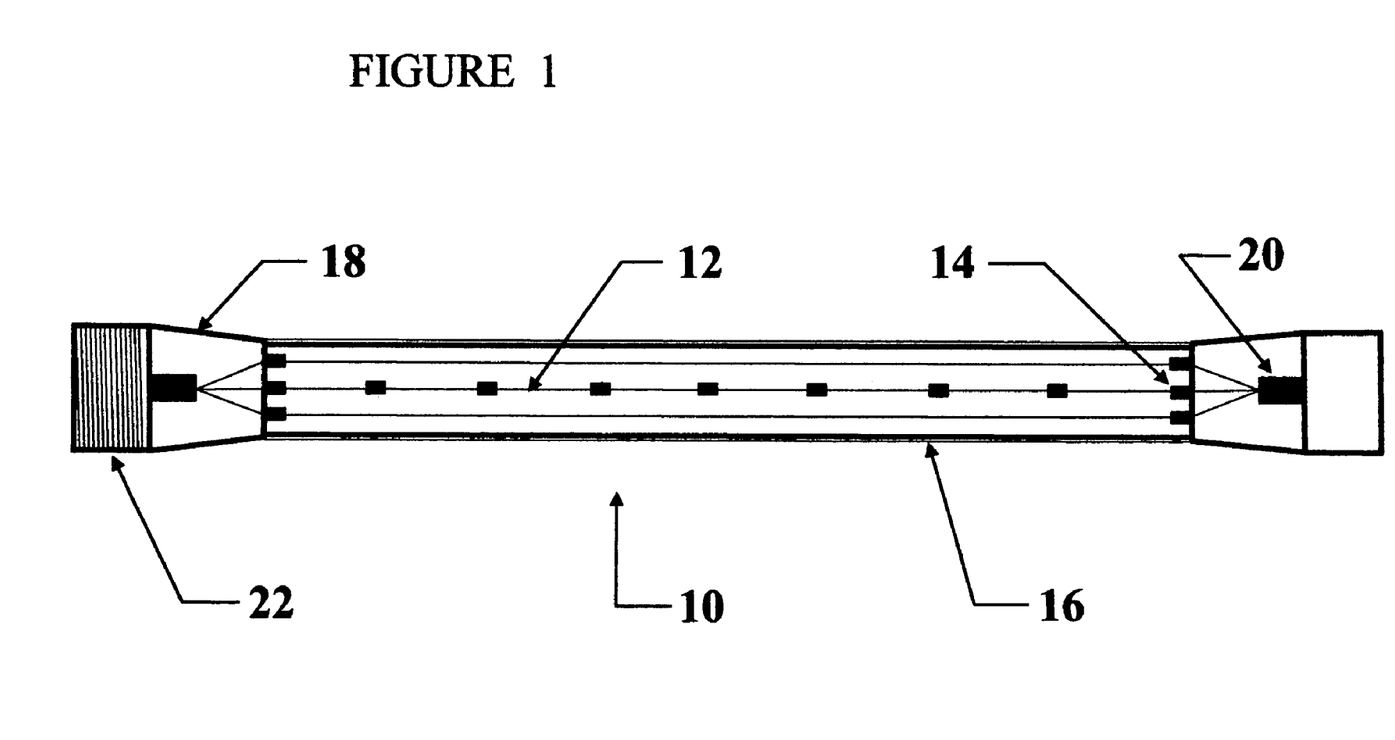
FIG. 1 is a side view of an of a long slender metal or composite tubular structure indicating the positioning of fiber optics apparatus required to make bending strain measurements.

Now referring to FIG. 1, which is a side view of a Long Slender Metal or Composite Structure 10 indicating the positioning of fiber optics apparatus required to provide strain measurements. The Long Slender Metal or Composite Structure 10 is a single segment of a long assembly of similar structures joined together with Threaded End Coupling 22 located on End Termination 18 or by other means. Axial Optical Fibers 12 are positioned along the axis of the Long Slender Metal or Composite Structure 10 and the glass or plastic optical fibers have Optical Reflective Interfaces 14 to provide capabilities consistent with either time of flight instrumentation such as Optical Time Domain Reflectometry or as gratings for Bragg diffraction strain measurements. Optical Reflective Interface 14 may be placed at each end of the optical fiber which is rigidly attached to the long slender structure making possible a gage length of the entire length of the Long Slender Metal or Composite Structure10 and at intermediate positions along the length of the Axial Optical Fiber 12 to provide shorter gage lengths. Structural analysis programs can be used to predetermine the expected vibration characteristics and guide the selection of the placement of Optical Reflective Interfaces 14. Bragg diffraction grating is a localized diffraction grating within the optical fiber on the order of 1-inch in length and thus provides measurements of local strain. The optical signal generated at Optical Reflective Interfaces 14 are channeled into a Fiber Optics Connection Box 20 located each end of the Long Slender Metal or Composite Structure 10 and subsequently into other Fiber Optics Connection Boxes 20 located on adjacent segments. The laser light is transported into the optical fiber from a source conveniently located near the end of the Long Slender Metal or Composite Structure 10 and the reflected response is transmitted back to the electronic optical signal monitoring instrumentation for signal interpretation and strain calculations. It may be preferred when monitoring the strain in structures located in remote locations to place the electronic optical signal monitoring instrumentation and laser light source in near proximity to the remotely located structure and transmit a digitized form of the interpreted signal by electrical or radio signal to a more accessible location.

Figure 2:
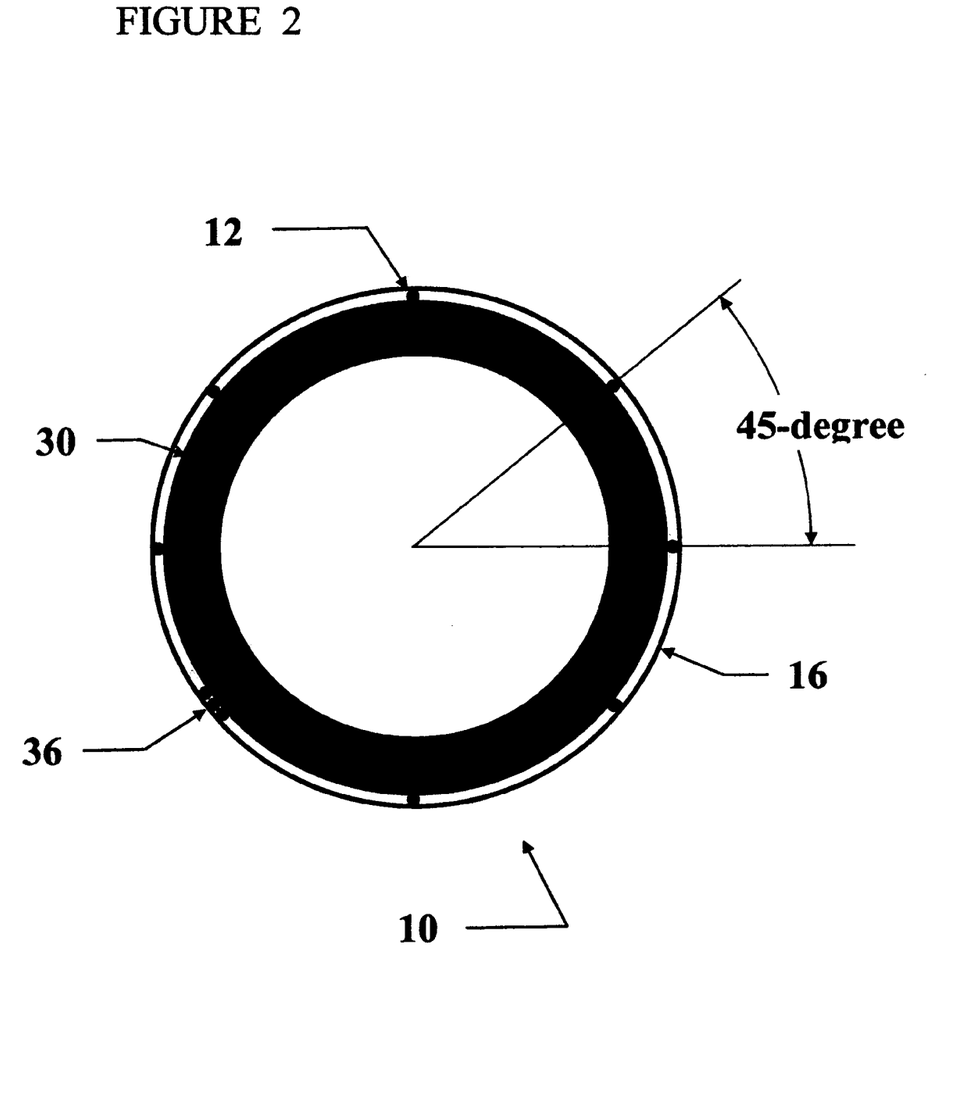
FIG. 2 is a cross-sectional view of a long slender metal or composite structure showing the positioning of longitudinal optical fibers around the circumference of the metal or composite tubular illustrated in FIG. 1.

Further referring to FIG. 2, which provides a cross-sectional view of the Long Slender Metal or Composite Structure 10 with rigidly attached Axial Optical Fibers 12. The tube has a Metal or Composite Structure 30. Axial Optical Fibers 12 may consist of a single fiber which traverses along the length of the Long Slender Metal or Composite Structure 10 including for a discrete length of from one end of the segment to the other. For greater strain measurement sensitivity, the optical fiber may be looped back and forth to provide a longer gage length, Optical Fiber Looped End to End 36. A single optical fiber traversing from one end of the segment to other end is considered adequate for tubes with long length segments such as risers used in offshore exploration and production.

Figure 3:
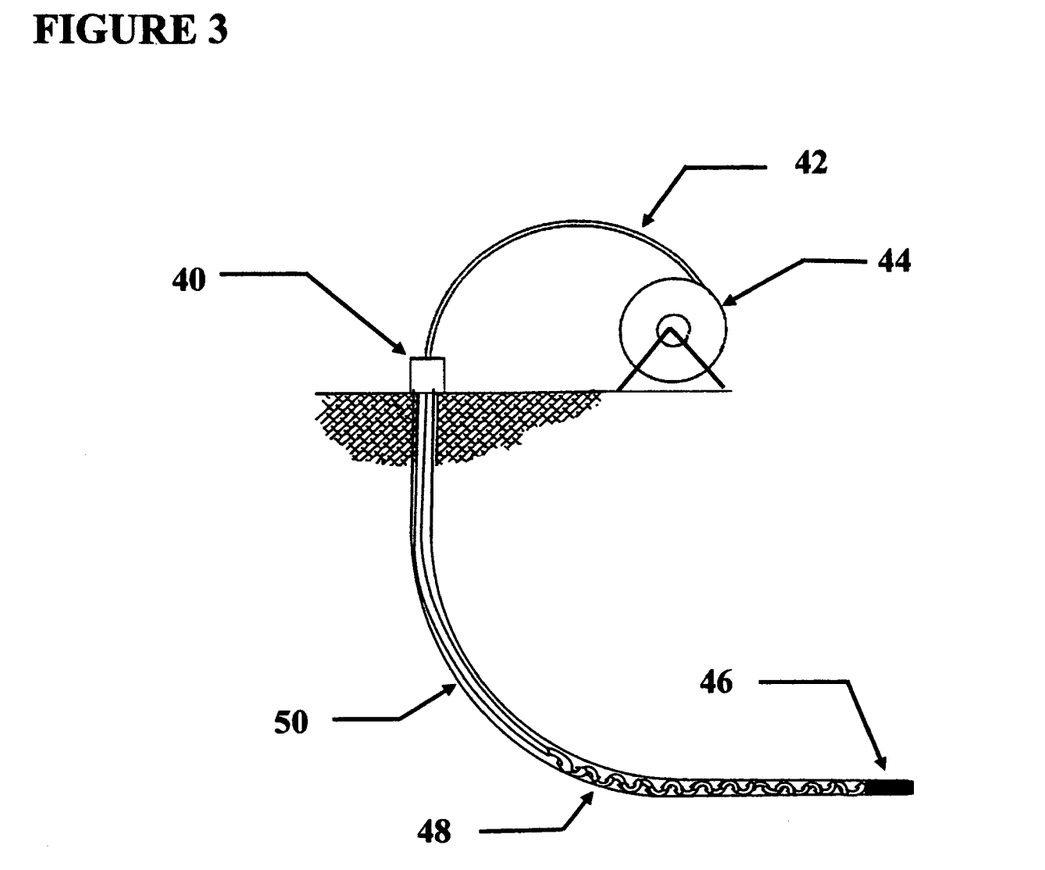
FIG. 3 is a schematic of a coiled tubing rig injecting spoolable pipe into a small diameter annulus illustrating the state of spiral or helical bucking induced by axial compressive forces imposed on the long slender spoolable pipe structure restrained laterally by the small diameter annulus.

Further referring to FIG. 3, which provides a schematic view illustrating coiled tubing equipment deploying Spoolable Pipe 42 from a Storage Spool 44 into a Small Diameter Annulus 50. The Coiled Tubing Injector 40 grips the Spoolable Pipe 42 controlling the descent during insertion into the predrilled low friction vertical section of the Small Diameter Annulus 50. As the Small Diameter Annulus 50 deviates from vertical and frictional forces exceed the weight of the Spoolable Pipe 42 suspended in the Small Diameter Annulus, the Coiled Tubing Injector 40 applies compressive force onto the Spoolable Pipe 42 to force it further into the Small Diameter Annulus 50. The Small Diameter Annulus 50 is typical created by a Mud Motor Drilling Tool 46 driven by the circulation of mud under high pressure which flow down the Spoolable Pipe 42 and back to the surface in the space between the Spoolable Pipe 42 and the Small Diameter Annulus 50. Extension of the length of the Small Diameter Annulus 50 is accomplished by the rotary action of the drill bit of the Mud Motor Drilling Tool 46 as it breaks up the earth formation. The compressive force of the drill bit upon the formation required for drilling is created by the pushing force of the Coiled Tubing Injector 40 and the weight of the Spoolable Pipe 42 suspended in the vertical portion of the Small Diameter Annulus 50. Small particles broken from the formation are carried to the surface with the circulation of the drilling mud. It is common practice in modern petroleum drilling operations to extend a Small Diameter Annulus 50 from a vertical into a deviated or horizontal direction as illustrated in FIG. 3. As the horizontal portion of the Small Diameter Annulus 50 grows relative to the vertical portion, greater frictional forces are developed and the Coiled Tubing Injector 40 must apply increasing greater compressive force on the Spoolable Pipe 42 to advance the Mud Motor Drilling Tool 46 further into the Small Diameter Annulus 50. A stability condition develops in which the Spoolable Pipe 42 begins to buckle-in the Small Diameter Annulus 50. As greater and greater compressive forces are applied, the Spoolable Pipe 42 buckles in a Spiral or Helical Buckle 48 illustrated in FIG. 3. As greater and greater compressive force is applied and more and more friction is developed, a buckling condition is reached at which the force required to retract the pipe back out of the Small Diameter Annulus 50 are greater than the pulling force capability of the Coiled Tubing Injector 40 or the strength of the Spoolable Pipe 42 and a condition of lock-up occurs. Coiled tubing Lock-up is a serious problem and preventive measures to avoid this condition are important considerations.

The capability to provide bending and vibration information for loads imposed by Vortex Induced Vibrations (VIV) and other dynamic disturbances is provided by positioning multiple sets of optical fibers along the longitudinal axis of the long slender structure spaced around the circumference with Longitudinal Optical Fiber Circumferential Spacing 34 illustrated in FIG. 2. For bending strain measurements it is necessary to have strain information from opposite sides of the tube and to capture the maximum bending strain; it is necessary to have multiple sets of back to back optical fiber strain gages. Each set of Axial Optical Fibers 12 is located on the structure at opposite ends of an imaginary line drawn perpendicular to the longitudinal axis of the long slender structure and through the structure centroid thereby enabling the measurement of the maximum bending strain imposed during dynamic loading. For illustration, a 45-degree spacing around the circumference is shown in FIG. 2 thus providing 4 sets of bending strain measurements.

Axial Optical Fibers 12 can be placed on the outside of a Long Slender Metal or Composite Structure10 following fabrication or optionally for composite and rope or cable structures; integrated during the structure's manufacturing. The optical fibers can be bonded using an adhesive such as epoxy directly to the tube and a Protective Outer Layer and Fluid Barrier 16 is laid over the optical fiber to further protect it from impact and the environment. Similar protection can be provided the Axial Optical Fiber 12 in the transition into the Fiber Optics Connection Box 20 located on the End Termination 18 illustrated on FIG. 1 by inserting it into a tube. The Axial Optical Fiber 12 thus does not experience strain in the region outside the gage length define as the length between Optical Reflective Interfaces. As discussed above, for spoolable metal coiled tubing, an alternative location for the optical fibers is on the inside of the tubing.

A Long Slender Metal or Composite Structure 10 is normally connected to adjacent tubes using a Threaded End Connection 22. In near proximity to the end connection is located a Fiber Optics Connection Box 20 which serves as the termination point for Axial Optical Fibers 12 and serves as the connection junction for transferring optical signals from one structural segment to the next segment and eventually to the surface and into a Optical Time Domain Reflectometry, Bragg diffraction grating or other optical signal interpretation instrument used to process the laser light reflected signal. An alternative way to transfer the strain data to the surface is to locate the Optical Time Domain Instrument or Bragg Diffraction Grating instruments in a control box attached to the tube, and digitize the data and send it to surface with electronic telemetry or electrical wire.

The basic principals of the invention which measures the dynamic response of long slender structures involves a system composed of: (1) attachment of optical fibers (glass or polymeric) near the exterior of the body of a long length slender metal or composite structure, (2) the placement of reflective interfaces at selected locations along the length of the optical fibers, (3) introduction of a laser light source into the optical fiber for purposes of generating a reflective or frequency based light response at the reflective interface, (4) electronic optical signal monitoring instrumentation to analyze the light signals reflected or transmitted from optical reflective interfaces in the optical fibers for the purpose of determining the bending strain within predetermined segments along the length of the long slender structure, and (5) fiber optics or electronic data transmission link to transport the reflected optical fiber light signal data to the electronic optical signal monitoring instrumentation.

The optical fibers are rigidly attached to the long slender structure by the bonding agent and additional protection can be provided by a secondary outer protective layer such as is typically required for other purposes including sealing a composite tube laminate against fluid intrusion. , and The optical fiber leads from the end of the gage section into a central fiber Optics Connection Box 20 should be isolated again strain since it is important not to impose strain in the optical fiber outside the gage section and it can be provided protection by insertion into a carrier tube. For application of the bending strain measurement system for dynamic characterization of ropes and cables, the preferred method is to integrate the optical fibers into the construction of the rope or cable during manufacture. One method is to place the optical fiber on or near the outer surface of the rope or cable and overlay a protective braid or polymeric coating as is a common practice in rope and cable construction to protect the rope or cable. The outer braided cover commonly used in the construction of large diameter mooring ropes deployed for station keeping on offshore platforms is tightly applied and will provide sufficient friction during loading to impose upon the axial optical fiber near identical axial strain to that experienced [0036 A] Further referring to FIG. 3, which provides a schematic view illustrating coiled tubing equipment deploying Spoolable Pipe 42 from a Storage Spool 44 into a Small Diameter Annulus 50. The Coiled Tubing Injector 40 grips the Spoolable Pipe 42 controlling the descent during insertion into the predrilled low friction vertical section of the Small Diameter Annulus 50. As the Small Diameter Annulus 50 deviates from vertical and frictional forces exceed the weight of the Spoolable Pipe 42 suspended in the Small Diameter Annulus, the Coiled Tubing Injector 40 applies compressive force onto the Spoolable Pipe 42 to force it further into the Small Diameter Annulus 50. The Small Diameter Annulus 50 is typical created by a Mud Motor Drilling Tool 46 driven by the circulation of mud under high pressure which flow down the Spoolable Pipe 42 and back to the surface in the space between the Spoolable Pipe 42 and the Small Diameter Annulus 50. Extension of the length of the Small Diameter Annulus 50 is accomplished by the rotary action of the drill bit of the Mud Motor Drilling Tool 46 as it breaks up the earth formation. The compressive force of the drill bit upon the formation required for drilling is created by the pushing force of the Coiled Tubing Injector 40 and the weight of the Spoolable Pipe 42 suspended in the vertical portion of the Small Diameter Annulus 50. Small particles broken from the formation are carried to the surface with the circulation of the drilling mud. It is common practice in modern petroleum drilling operations to extend a Small Diameter Annulus 50 from a vertical into a deviated or horizontal direction as illustrated in FIG. 3. As the horizontal portion of the Small Diameter Annulus 50 grows relative to the vertical portion, greater frictional forces are developed and the Coiled Tubing Injector 40 must apply increasing greater compressive force on the Spoolable Pipe 42 to advance the Mud Motor Drilling Tool 46 further into the Small Diameter Annulus 50. A stability condition develops in which the Spoolable Pipe 42 begins to buckle in the Small Diameter Annulus 50. As greater and greater compressive forces are applied, the Spoolable Pipe 42 buckles in a Spiral or Helical Buckle 48 illustrated in FIG. 3. As greater and greater compressive force is applied and more and more friction is developed, a buckling condition is reached at which the force required to retract the pipe back out of the Small Diameter Annulus 50 are greater than the pulling force capability of the Coiled Tubing Injector 40 or the strength of the Spoolable Pipe 42 and a condition of lock-up occurs. Coiled tubing Lock-up is a serious problem and preventive efforts are important to avoid this condition.

Glass or polymeric optical fibers are positioned at selected locations on the outside surface of the Long Slender Metal or Composite Structure 10. Glass fibers have lower attenuation than polymeric fibers and are the preferred optical fiber of choice for measuring small strains (less than approximately 1-percent) while plastic optical fibers such as polymethyl methacrylate or perfluorocarbon, which have strain capabilities exceeding 5-percent and relatively low attenuation for a polymeric optical fiber, are appropriate for large strain measurements. In general, the glass optical fiber capability is adequate for most high performance tubulars proposed for use in the oil industry such as risers. The utilization of fiber optics to measure peak strains in spoolable composite pipe would normally require polymeric optical fibers since the strains imposed during spooling and service typically exceed 1-percent.

It is considered sufficient to determine the general state of structural integrity by measuring critical bending strains experienced on the exterior of a long slender metal or composite structure. Integrating optical fibers into a composite laminate body can be accomplished, but is a difficult complication to impose during the manufacture of the composite structure (filament winding or other process); especially to maintain the integrity of the optical carrier leads. The preferred technique is to attach the optical fibers on the exterior of the structure following manufacture in a separate operation. The sequence is to finish the manufacture of the tube including end coupling and to carefully place the optical fibers onto the outside body of the tube and end coupling using a bonding agent such as epoxy. In this process, the optical fiber end leads are also carefully extended into the Fiber Optics Connection Box 20. A low modulus resin or elastomer may be used to bond the fiber optics ends to the tube in the region of the end connection and if necessary the optical fiber can be inserted in a protective sleeve for protection and to eliminate strain imposed on the optical fiber in this transition region. Once the fibers are so located and bonded in place, an additional protection layer may be placed over this assembly. Such a protective outer layer is typically used for high performance tubular products such as deepwater risers in order to protect the structure during handling and for composite risers to prevent the ingress of sea water into the composite.

A discussion of the specific bending strain measurements of interest for primary tube structure applications are outlined below.

Tube Body Axial Strain Using OTDR or Bragg Diffraction Gratings

The axial strain in the body of the pipe is measured in a discrete local region using Bragg diffraction gratings while the average strain over a longer section of the tube is measured using the Optical Time Domain Reflectometry (OTDR) strain measurement method. The OTDR method measures the time of flight for light reflected from reflective interfaces placed at selected locations along the length of the optical fiber and thus directly measures, through calibration, the change in the length between the two interfaces. These light reflection interfaces can be placed to provide strain measurements of short as well as long gage lengths. In one application the reflective interfaces would be placed at each end of an optical fiber rigidly attached along the length of a metal or composite tube and thus provide a strain measurement of the average strain over the entire length of the long tube such as a riser used in offshore drilling and production operations. If greater accuracy is needed, the optical fiber can be traversed back and forth from one end of the tube to the other as many times as is needed to provide the required strain measurement accuracy.

Measurement of the longitudinal strain in the composite tube provides valuable information about the state of the "fitness for service" of the composite tube when compared to design allowables and expected threatening conditions. Measurement of strains imposed by Vortex Induced Vibration (VIV) is a phenomenon of intense interest to oil company operators concerned about the safety of production and drilling risers. By placing optical fibers sensors on diametrically opposite sides of the tube, one can determine the strains due to bending which occur during the dynamic vibration imposed by the ocean currents, i.e., VIV. Since the direction of bending is not know, several diametrically opposed optical fiber sets must be introduced into the composite tube to be assured of obtaining the maximum bending effect. Four or more sets of diametrically opposite optical fiber strain gage sets could be used to provide an axial optical fiber every 45-degrees or less around the circumference. Typically, the period of the imposed vibration is on the order of several seconds which is consistent with the capability to measure and record strains by the OTDR or Bragg diffraction grating method.

With regard to VIV induced strain, the OTDR method using longitudinally-positioned, diametrically-opposite fiber optic sensor sets applies equally well to either metal or composite risers. The fiber optics technology application described herein would have an important role in enhancing the safety of offshore drilling and production operations.

As discussed above, optical fibers with Bragg diffraction gratings etched into an optical fiber can be used to measure local strain anomalies at selected locations along the length of the tube. A single optical fiber can have several diffraction gratings etched on it. The data acquisition system can individually interrogate each grating and thus provide multiple local strain measurements using the same optical fiber.

End Connection Optical Fiber Integration

The optical fibers are integrated into a central connection box mounted on the side of the composite or metal structure. Optical fibers are protected in the region of the connection box by an outer protective layer applied to the outside of the tube. In the region of transition from the point of measurement to the connection box, the optical fibers are inserted in a sleeve to prevent stains in the transition region from adding to the strains imposed in the gage section. Connector terminations developed by the telecommunications industry are used to collect large bundles of optical fibers. Optical signals from more remote tube sections are also introduced into the termination box. The signal from remote tubes are carried between connections using separate lines which can be located in a protective tube inside the tube outer protective layer or by a separate line attached to the tube.

Signal Transfer from Remote Sections of the Long Slender Structure

Two approaches are available for transporting the optical signal to the surface. The first approach is to provide continuous optical fiber paths to the surface. This method requires that optical fiber connections be made between individual segments of the long slender structure during installation. The second method is to locate the electronic optical signal monitoring instrumentation in close proximity to the long slender structure and use hard wire or remote telemetry to transfer the digital date signal to the surface. As required, repeaters can be used to relay and amplify the signal.

The preferred method for using optical fiber strain measurement methods involves the measurement of reflected light signals. For some applications of the technology it may be preferable to use the principles described herein based on transmitted light signals.

Thus, in summary, it can be seen that the invention provides an in situ structural integrity monitoring system utilizing fiber optics technology to generate detailed bending strain data used: (1) to characterize the vibration characteristics of long slender structures subjected to dynamic disturbances imposed by water or wind generated loads and (2) the bending and pending lock-up conditions of spoolable pipe injected into an annulus. Long slender structures include but are not limited to metal and composite tubulars, particularly risers used in deepwater petroleum drilling and production operations, and ropes and cables. Engineering interpretation of the strain data, for example, provides the capability to determine the vibration characteristics of drilling and production risers subjected to Vortex Induced Vibrations (VIV) caused by strong ocean currents including the vibration amplitude, frequency, and node to node wave length.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for determining the vibration characteristics of long slender structures using maximum bending strain measurements of said long slender structures subjected to dynamic disturbances imposed by water or wind generated dynamic loads, otherwise known as vortex induced vibrations (VIV), comprising:
projecting laser light into a single or plurality of independent optical fiber(s) fastened at discrete locations along the longitudinal axis of said long slender structure;
reflecting said projected laser light from optical reflective interfaces placed at discrete length segments along the length of each optical fiber in turn creating a reflected laser light data signal;
collecting through a fiber optics or electronic data transmission link said reflected laser data signal;
receiving and analyzing said collected laser light data signal at electronic optical signal monitoring instrumentation;
determining critical bending strains within said discrete length segments along the length of said long slender structure; and
calculating at least one of said vibration characteristics of said long slender structure from the determined critical bending strains in order to permit mitigation of damaging effects caused by VIV along said long slender structure through the use of corrective action.

2. The method of claim 1, wherein vibration characteristics include: vibration frequency, vibration amplitude, node-to-node wavelength, and the magnitude of the imposed peak bending strains.

3. The method of claim 1, further comprising:
locating the optical fiber(s) along the longitudinal axis and near the exterior or interior surface of said long slender structure.

4. The method of claim 1, further comprising:
locating the optical fiber(s) at opposite ends of an imaginary line drawn perpendicular to the longitudinal axis of said long slender structure and through said long slender structure centroid thereby enabling the measurement of said critical bending strains imposed during dynamic loading.

5. The method of claim 1, further comprising:
locating multiple sets of longitudinally oriented optical fibers on said long slender structure near opposite ends of an imaginary line drawn perpendicular to the longitudinal axis of said long slender structure and through said long slender structures centroid designed to capture the maximum bending strains imposed during dynamic loading.

6. The method of claim 1, used to measure said bending strains imposed by VIV experienced by metal or composite production and drilling risers, tubing, ropes, and cables deployed in offshore operations in the oil industry.

7. The method of claim 1, further comprising:
providing said calculated vibration characteristic information to offshore petroleum drilling and production operations; and
using said calculated vibration characteristic information to permit mitigation of potentially damaging effects of VIV in said long slender structure by the adjustment of the axial tension in said long slender structure and the addition of strakes, shrouds, and fairings to said long slender structure.

8. The method of claim 1, wherein said electronic optical signal monitoring instrumentation is capable of measuring the time of flight of light reflected from said optical interfaces;
using said time of flight information to determine said critical bending strains.

9. The method of claim 8, wherein said electronic optical signal monitoring instrumentation is optical time domain reflectometry instrumentation.

10. The method of claim 1, wherein said electronic optical signal monitoring instrumentation is optical frequency domain reflectometry instrumentation.

11. The method of claim 1, further comprising:
positioning said optical fiber(s) along the longitudinal axis of said long slender structure so as to traverse back and forth between opposite ends of said discrete length segments of said long slender structure along said longitudinal axis to provide greater sensitivity to the measurement of said critical bending strains through the use of time of flight instrumentation.

12. The method of claim 1, wherein the electronic optical signal monitoring instrumentation measures said critical bending strains using Bragg diffraction gratings.

13. The method of claim 1, further comprising:
rigidly attaching said optical fiber(s) to the exterior or interior surface of a metal or composite tubular within said long slender structure using a bonding agent; and
protecting said rigidly attached optical fiber(s) from damage by hazards imposed in the operating environment by a polymeric or elastomeric external layer.

14. The method of claim 1, wherein said optical fiber(s) used to measure said critical bending strains are constructed of glass or plastic.

15. The method of claim 1, wherein said long slender structures are either a rope or cable;
said determined bending strains and said calculated at least one vibration characteristic provide information needed to take action to permit mitigation of the potentially damaging effects of wind or water generated dynamic disturbances.

16. A method for measuring the bending and buckling characteristics of spoolable metal or composite pipe subjected to axial compressive loading during injection into a small diameter annulus, comprising:
projecting laser light into a single or plurality of independent optical fiber(s) fastened at discrete locations along the longitudinal axis of said spoolable metal or composite pipe;
reflecting said projected laser light from optical reflective interfaces placed at discrete length segments along the length of each optical fiber in turn creating a reflected laser light data signal;
collecting through a fiber optics or electronic data transmission link said reflected laser data signal;
receiving and analyzing said collected laser light data signal at electronic optical signal monitoring instrumentation;
determining critical bending strains within said discrete length segments along the length of said spoolable metal or composite pipe; and
calculating at least one bending and buckling characteristic of said spoolable metal or composite pipe from the determined critical bending strains to allow for corrective action to be taken to prevent helical buckling lock-up of said spoolable metal or composite pipe in said small diameter annulus.

17. The method of claim 16, further comprising:
locating the optical fiber(s) at opposite ends of an imaginary line drawn perpendicular to the longitudinal axis of said spoolable metal or composite pipe and through said spoolable metal or composite pipe centroid thereby enabling the measurement of said critical bending strains imposed during injection of said spoolable metal or composite pipe into said small diameter annulus.

18. The method of claim 16, further comprising:
locating multiple sets of longitudinally oriented optical fibers on said spoolable metal or composite pipe near opposite ends of an imaginary line drawn perpendicular to the longitudinal axis of said spoolable metal or composite pipe and through said spoolable metal or composite pipe centroid designed to capture the maximum bending strains imposed during injection of said spoolable metal or composite pipe into said small diameter annulus.

19. The method of claim 16, further comprising:
measuring said critical bending strain in said spoolable metal or composite pipe as said spoolable metal or composite pipe buckles into numerous short wavelength spiral and helical buckles inside said small diameter annulus in response to an axial compressive force imposed to push the spoolable pipe into the annulus by a coiled tubing injector or other injection apparatus.

20. The method of claim 16, further comprising:
providing said bending and buckling characteristic information to petroleum drilling and production operations; and
using said calculated bending and buckling characteristic information to prevent said spoolable metal or composite pipe from entering a condition of lock-up inside said small diameter annulus by reducing the applied axial compression force to said spoolable metal or composite pipe.

21. The method of claim 16, wherein said electronic optical signal monitoring instrumentation is optical time domain reflectometry strain instrumentation.

22. The method of claim 16, wherein said electronic optical signal monitoring instrumentation is optical frequency domain reflectometry strain instrumentation.

23. The method of claim 16, wherein said electronic optical signal monitoring instrumentation is Bragg diffraction grating strain measurement instrumentation.

24. The method of claim 16, further comprising:
positioning said optical fiber(s) along the longitudinal axis of said spoolable metal or composite pipe so as to traverse back and forth between opposite ends of said discrete length segments of said spoolable metal or composite pipe along said longitudinal axis to provide greater sensitivity to the measurement of said critical bending strains through the use of time of flight instrumentation.

25. The method of claim 16, further comprising:
rigidly attaching said optical fiber(s) to the exterior or interior surface of said spoolable metal or composite pipe using a bonding agent; and
protecting said rigidly attached optical fiber(s) from damage by hazards imposed in the operating environment by a polymeric or elastomeric external layer.

26. The method of claim 16, further comprising:
locating the optical fiber(s) along the longitudinal axis and near the exterior or interior surface of said spoolable metal or composite pipes.

27. The method of claim 16, further comprising:
integrating said optical fiber(s) into the interior of said spoolable metal or composite pipe following said spoolable metal or composite pipe fabrication;
said optical fiber integration method comprising:
inserting a cylindrical foil carrier consisting of an outer layer of adhesive;
attaching said optical fibers longitudinally into said foil carrier;
pressurizing the interior of said foil carrier with a hot fluid or gas in order to cure said adhesive to bond said foil carrier to said spoolable metal or composite pipe.

28. The method of claim 16, further comprising:
integrating said optical fiber(s) into the body of said spoolable metal or composite pipe during manufacture.

29. The method of claim 16, further comprising:
carrying out said critical bending strain measurements of said spoolable metal or composite pipe in a region of deployment onto and off of a storage spool;
providing said measured critical bending strain information in order to asses the structural integrity of the spoolable metal or composite pipe.

* * * * *